Figure 1:
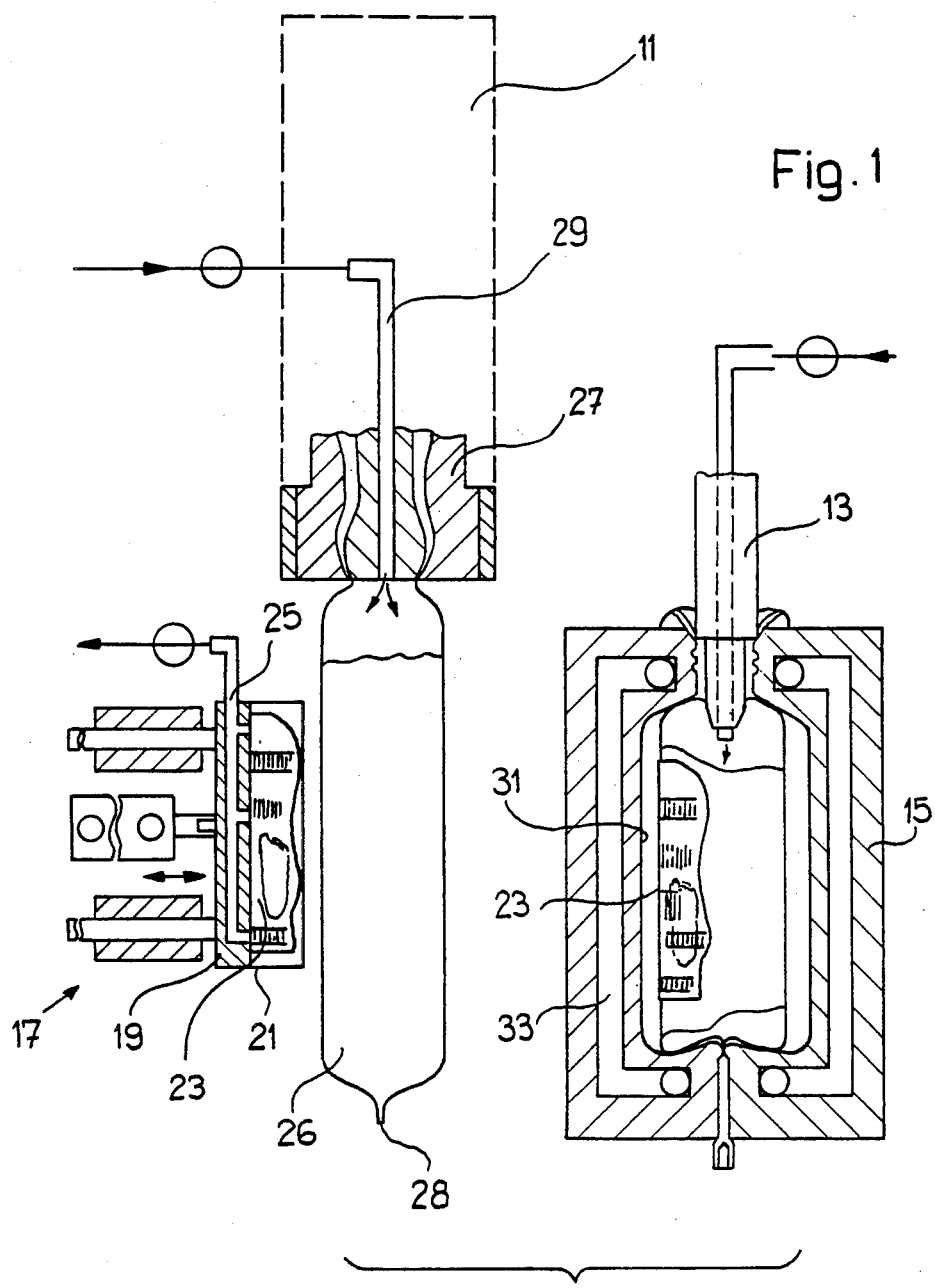

United States Patent [19]

Lehner

[11] Patent Number: 4,605,462
[45] Date of Patent: Aug. 12, 1986

[54] METHOD OF ATTACHING A SHEETLIKE OBJECT, E.G., A LABEL, TO A HOLLOW BODY OF PLASTICS

[75] Inventor: Alwin Lehner, Hard, Austria

[73] Assignee: Soplar SA, Altstätten, Switzerland

[21] Appl. No.: 691,374

[22] Filed: Jan. 14, 1985

Related U.S. Application Data

[63] Continuation of Ser. No. 511,562, Jul. 6, 1983, abandoned.

[30] Foreign Application Priority Data

Jul. 6, 1982 [CH] Switzerland .................. 4103/82

[51] Int. Cl.⁴ .......................................... B29C 49/24
[52] U.S. Cl. ............................... 156/245; 156/244.14;
264/509; 264/515; 264/516; 425/503; 425/523
[58] Field of Search ............... 264/509, 515, 516;
425/503, 523; 156/245, 244.14

[56] References Cited

U.S. PATENT DOCUMENTS

| 3,287,198 | 11/1966 | Battenfeld | 264/509 |
| 3,503,826 | 3/1970 | Nasica | 264/509 |
| 4,323,411 | 4/1982 | Uhlig | 264/509 |

FOREIGN PATENT DOCUMENTS

| 0245545 | 3/1983 | Australia | 264/509 |
| 2817572 | 11/1978 | Fed. Rep. of Germany | 264/509 |

Primary Examiner—Jan Silbaugh
Assistant Examiner—Hubert C. Lorin
Attorney, Agent, or Firm—Frishauf, Holtz, Goodman & Woodward

[57] ABSTRACT

To provide hollow plastic bodies, e.g. bottles, with an inscription, a sheetlike object (23), e.g. a label, is pressed at least in part against an unfinished piece (26) while still being in deformable condition. This unfinished piece (26) is then brought, together with the preliminarily attached label into a blow mould (15). In blowing the bottle (26') the label (23) is strongly pressed against the bottle wall, because the label is held by the inner wall (31) of the blow mould.

9 Claims, 3 Drawing Figures

METHOD OF ATTACHING A SHEETLIKE OBJECT, E.G., A LABEL, TO A HOLLOW BODY OF PLASTICS

This application is a continuation of application Ser. No. 511,562 filed July 6, 1983, now abandoned.

The invention relates to a method of attaching a sheetlike object, e.g. a label, on a hollow body of plastic material.

BACKGROUND

In manufacturing of hollow bodies, e.g. bottles, boxes and other objects of thermoplastic material it is known to provide wordings by embossing the surface. For this purpose the blow mould must have a corresponding engraving. However, a disadvantage is that such a wording cannot easily be read, because there are no light or color contrasts. To avoid this disadvantage hollow bodies are very often printed after manufacturing. However, in addition to printing, this requires a special operation because of the properties of the material. It is, e.g. necessary, to subject the containers to a flame prior to printing, so that they accept the printing color. After printing the containers must run through drying tunnels. Accordingly, printing is relatively expensive and has further the disadvantage that heating may cause shrinking of the containers. In addition much manufacturing space is required for these operations.

It is also known to provide containers with labels after the blow operation or the filling operation. In this case very often stringent requirements are made on the exact form of the labeling surface on the container. These requirements may already increase the manufacturing cost of the container. A disadvantage is also the time lost by possible malfunction of the labeling machine. Very often labeling is made on a filling line, so that a malfunction on labeling may stop the whole production line.

It is already known to put a label or a plastic foil with pictures to the container within the blow mould. However, this requires expensive moulds and is only possible within relatively narrow limits, i.e. only on certain labeling surfaces, because a window must be provided on the mould to insert the label. In addition the space for the necessary mechanism must be present. A disadvantage is further, that the attaching of the label increases the cooling time for the blow cycle. The cooling ducts cannot be located optimally, because of the windows for feeding labels. Accordingly the cooling cycle becomes longer. This increases production cost. Also the higher tool cost for a mould with labeling windows increases production cost. An additional advantage is that economic manufacturing with multiple forms is not possible.

THE INVENTION

It is therefore an object to avoid the disadvantages of prior art methods and to create a method for attaching of sheetlike objects, e.g. labels of paper or plastics, in manufacturing of hollow bodies of plastic without increasing the blow cycle time and limiting the labeling surface.

According to the invention prior to inserting of the plastic into the mould, that is, while the plastic is in a soft, unfinished state the sheetlike object is pressed, at least in part against the unfinished piece where it will adhere, the final adhesion being carried out in the blow mould.

On machines on which the unfinished piece is extruded in the form of a length of tube the invention can make use of the fact, that several seconds elapse between the beginning of the extrusion operation until the time when the extruded section of tube has the necessary length to manufacture a container. In this time a relative motion between the sheetlike object and the section of tube which forms a hollow element can be accomplished to press the sheetlike object slightly against the tube wall which is still in plastic condition. In this way the sheetlike object is attached to the tube wall. Because the tube has its highest temperature immediately after extrusion the best conditions for good adherence of the sheetlike object to the still sticky surface of the tube are present.

However, it is of particular importance that the inventive method gives great freedom in attaching the sheetlike object, because there are no limits of the labeling surfaces due to the design of the blow mould to be observed. The sheet-like object, e.g. a label, is preliminarily adhered to the extruded material while the material is free and outside the blow mold. Because there are no windows in the mould also the disadvantages of such windows are not present, such as limited labeling surfaces, limited cooling, higher cost of the blow mould. The great freedom in attaching the sheetlike object also permits e.g. to attach different labels at different places of the hollow body. For example, labels may be attached on opposite sides of a bottle.

The sheetlike objects referred to in this specification not only comprise labels. If for instance spherical bottles are manufactured these bottles may be provided at the bottom with a ring of paper board, plastics or the like having the purpose to keep the bottle upright. Such rings or thelike may also have imprints. Spherical bottles are capable of containing high internal pressures and are used e.g. for carbonated drinks, such as beer.

As mentioned above, the sheetlike object may have still other functions than a label. Because of its intimate connection with the wall of the hollow body a reinforcement of this wall is obtained. The method of the invention has therefore also the advantage that under certain circumstances the wall thickness of the hollow body can be kept thinner where the sheetlike object is attached, because a reinforcement takes place by the sheetlike object. In this way material may be saved.

According to a preferred embodiment of the invention the sheetlike object is pressed against the unfinished piece, i.e. the hollow element only when said unfinished piece is under pressure of gas in its interior. In this case the hollow element is, at the time of attachment closer to its final form than in its tube stage, so that no high expansion forces act on the sheetlike object.

Preferably the sheetlike object is pressed against the unfinished piece when the unfinished piece hangs on the extrusion nozzle or a holding device. Close to the extrusion device there is, normally, also sufficient space to provide a device for holding the sheetlike objects ready and to press them against the unfinished piece. A further advantage is that the temperature of the unfinished piece is in this moment still high so that the sheetlike objects sticks best.

The sheetlike object may be pressed against the unfinished piece during extrusion of a piece of tube constituting said unfinished piece. In this case it is only necessary to provide that the sheetlike object moves at the moment of pressing in the same direction as the piece of tube. An advantage of this method consists in that no additional time at all is necessary for labeling and that the labeling device is in no way hindering other devices.

In many cases it is of advantage when, prior to pressing the sheetlike object against the piece of tube, the free end of the tube is closed and the piece of tube is blown up until its surface has the favourable size for attaching the sheetlike object. It is also possible that the sheetlike object is connected only to a small surface area of the unfinished piece, e.g. along a longitudinal zone or strip extending parallel to the direction of extrusion of the tube, and that the complete attachement of the sheetlike object to the hollow body takes place only in the following blowing operation in the mould. In this case there is no danger that the label is unduly stretched.

The method has the advantage that several sheetlike objects can be attached to a hollow body. Up to the present day this was practically impossible, because on a mould it is not possible to provide many windows.

The invention also includes a device for carrying out the method. This device comprises at least one feeding device having a gripper which, prior to feeding of unfinished piece to the blow mould, keeps a sheetlike object ready and presses it against the unfinished piece during a relative motion between feeding device and unfinished piece. This device can easily be manufactured and can also be easily mounted on existing blowing machines. Preferably the gripper has a suction head to grip and hold the sheetlike object. A suction head provides very reliable operation.

It is of advantage to have the gripper located at the extrusion nozzle or at the holding device. When the unfinished piece leaves the extrusion nozzle it is still very hot and sticky and therefore the label will savely stick reliably.

The gripper may be located in acute angle or parallel, to the axis of the extrusion nozzle to move the sheetlike object, during pressing against the unfinished piece, in the same direction as the unfinished piece moves during extrusion. This arrangement proved to be very reliable and makes good use of the extrusion time for labeling.

DRAWINGS

Figure 2:
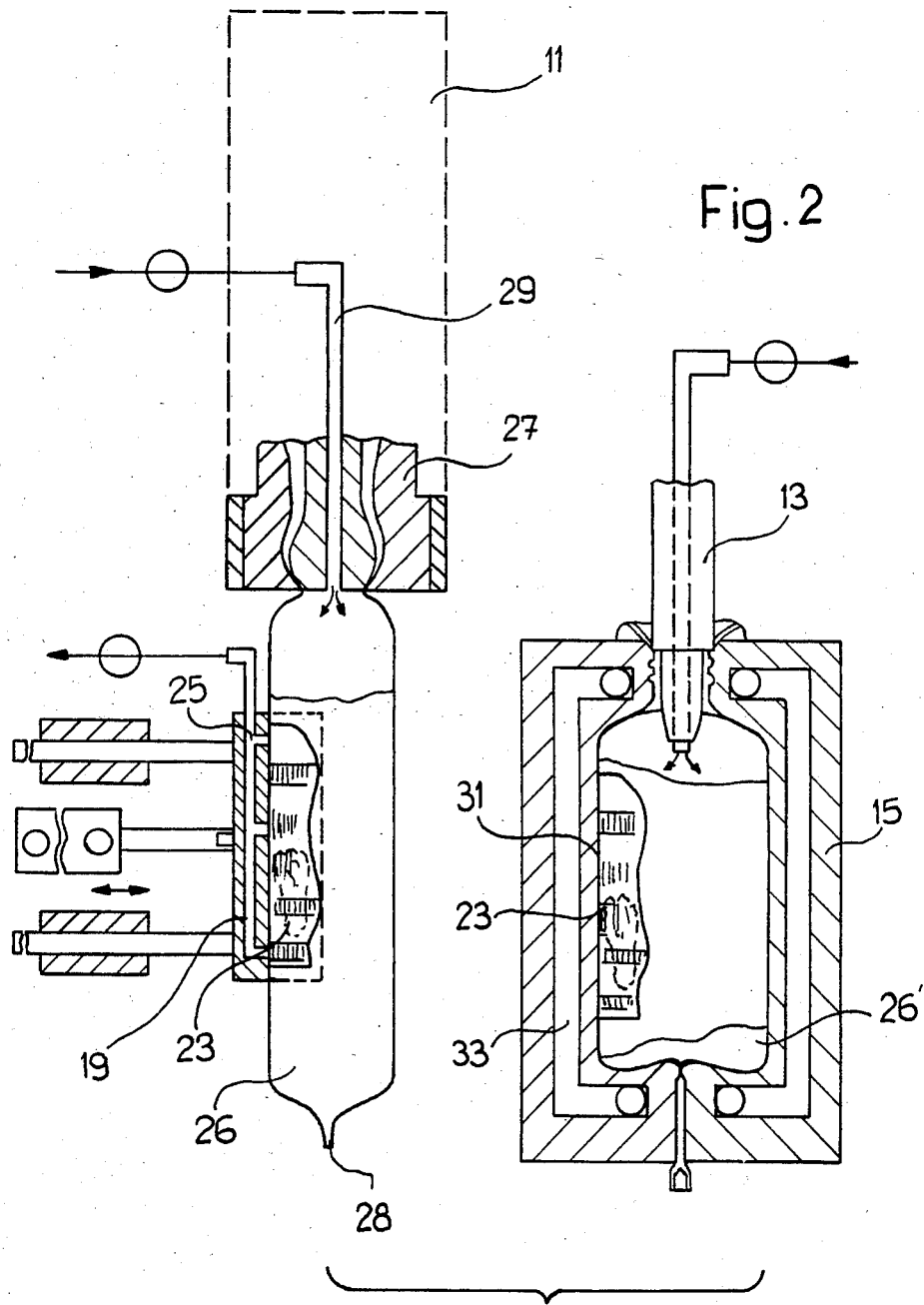
Figure 3:
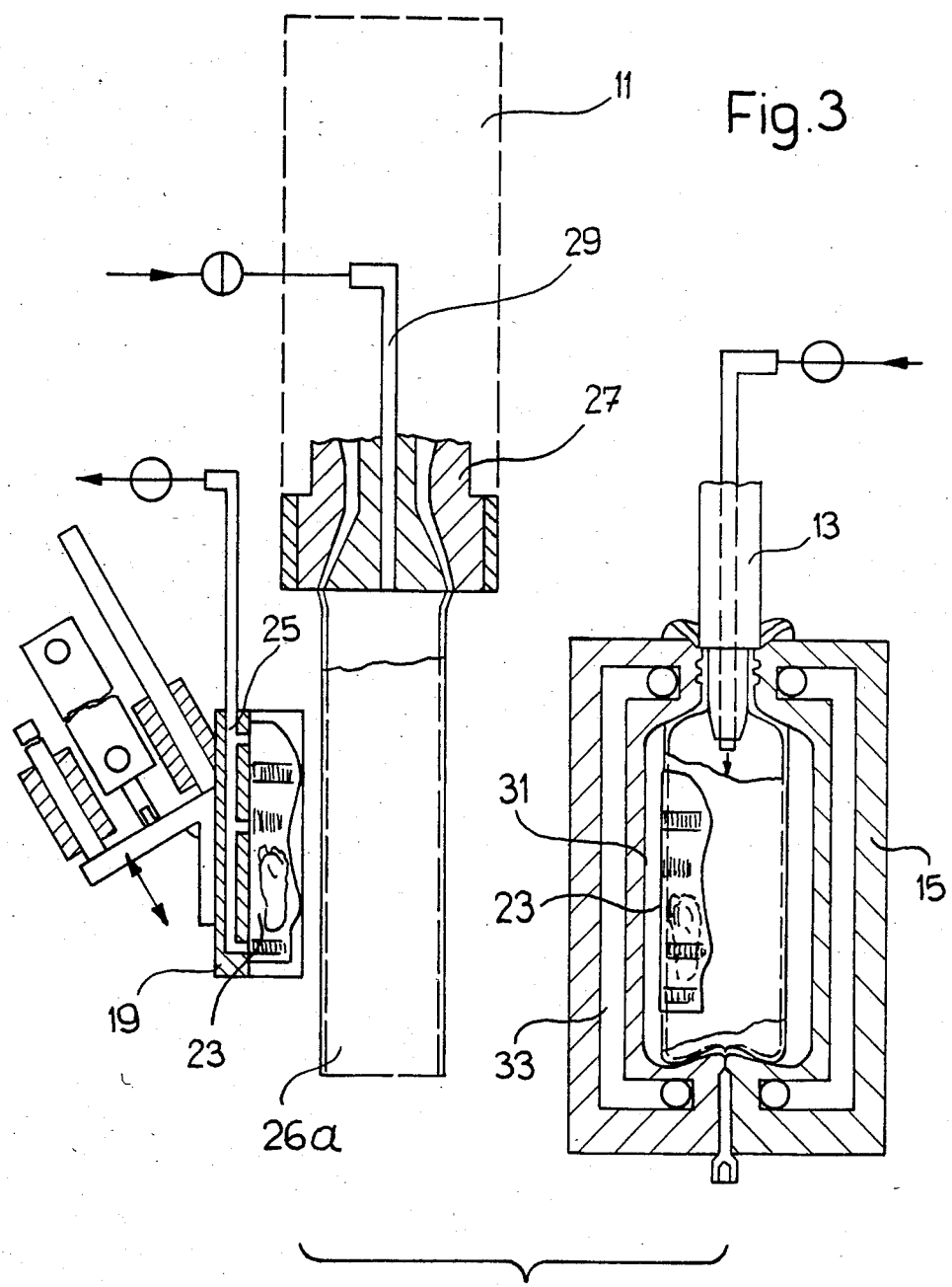

FIG. 1 shows manufacturing and labeling of a bottle in a blowing machine, the labeling device being ready to press a label against the unfinished piece, and there being at the same time a bottle blown in the blow form, FIG. 2 shows the blow machine according to FIG. 1 at the moment where the label is attached to the unfinished piece and the bottle in the form is completed, FIG. 3 shows a blow machine as in FIG. 2, but where the label is attached to a tube-like piece during extrusion of said tube-like piece.

In FIG. 1 the tube head 11, the blow nozzle 13 and the blow mould 15 of the blow machine are visible. The general reference 17 shows, schematically, a device for attaching of flat objects, e.g. labels. This device substantially comprises a gripper 19 having a suction head 21 for gripping and holding a sheetlike object 23. Reference numeral 25 designates a vacuum duct to which an underpressure is applied to grip a single sheetlike object 23. The suction is maintained until the label 23 touches the unfinished piece 26.

The unfinished piece or hollow element 26 has been extruded from the extrusion nozzle 27 and has been closed at the bottom by squeezing. Over the duct 29 the unfinished piece 26 has been blown up with a gas, e.g. compressed air, until it had the form shown whose diameter is larger than the diameter of the nozzle 27.

In FIG. 1 an unfinished piece or hollow element 26 is about to be inserted into the blow form 15 while the blow nozzle has just started to blow a bottle 26' (FIG. 2) previously extruded. The fully blown bottle 26' can be seen in FIG. 2. In blowing, the label 23 is pressed against the inner wall 31 of the blow form. In this way the label 23 is placed everywhere into strong contact with the wall of the bottle, under pressure. Accordingly a strong bond is obtained. The blow mould 15 has cooling ducts 33 cooling the bottle 26 still which is hot.

As FIG. 2 further shows, during the time when a previously labeled bottle 26' is blown in the blow mould 15 the gripper 19 is moved against the unfinished piece or hollow element 26 to attach thereon a label 23. The gripper 19 is then again withdrawn into its original position, so that after opening the form 15 and removing of the finished bottle 26' a newly supplied unfinished piece 26 together with the label 23 can be inserted into the blow mould 15.

On the embodiment shown in FIG. 3 the label 23 is attached during extrusion of a tube length 26a. For this purpose the gripper 19 is located at an acute angel to the axis of the extrusion nozzle 27. Because of this the label 23 is moved, during pressing against the unfinished piece 26a, in practically the same direction as the unfinished piece 26a moves during extrusion. Otherwise the blow machine operates in a similar way as previously described. However, because the unfinished piece 26a is not blown up prior to its insertion into the blow mould 15 no gas is fed to it over the duct 29.

I claim:

1. Method of blow-molding a hollow body of plastic material, espcially of vessel or bottle shape, and applying a sheet-like element (23) forming a label on the hollow body (26') as the hollow body is being made,
    comprising the steps of
    hot-extruding a hollow element from an extrusion nozzle (27);
    applying the label to the hollow element as it is being extruded and while the hollow element is suspended from the extrusion nozzle, by pressing at least a portion of the label against the hot surface of the hollow element upon the hollow element being extruded by, and while still suspended from the extrusion nozzle in advance of blow-molding, while free of the blow mold and while still hot consequent to hot-extrusion, to preliminarily adhere the sheet-like element (23) on the hollow element;
    then introducing the extruded hollow element, with the sheet-like element preliminarily and at least in part adhered thereto, into a blow mold (15) between the outer surface of the hollow element and the inner wall of the blow mold;
    and then introducing pressurized gas into the blow mold to expand the hollow element, form the hollow element into the shape of the body and to finally adhere the sheet-like element to the hollow element over the entire surface of the sheet-like element as the sheet-like element and the plastic material are being pressed against the walls of the mold by blow-molding the hollow element.

2. Method according to claim 1, including the step of preliminarily introducing a gas at pressure above atmospheric to the interior of the extruded hollow element, and carrying out the step of pressing at least the portion of the label against the hot surface of the hollow element which has said gas introduced thereinto.

3. Method according to claim 1, wherein the hollow element is extruded in form of a tube, including the step of closing the free end of the tube;

preliminarily blowing the so-closed tube to expand the surface thereof to a predetermined size;

and then carrying out the step of pressing at least a portion of the label against the so-blown and expanded surface, prior to finish-blowing the body in the mold.

4. Method according to claim 3, wherein the step of pressing the label against the hot surface of the hollow element comprises pressing essentially the entire label against the preliminarily blown hollow element.

5. Method according to claim 1, wherein the step of pressing the label against the hot surface of the hollow element comprises pressing only a minor portion of the label against the hot surface of the hollow element.

6. Method according to claim 5, wherein said minor portion extends, essentially, along a longitudial zone or strip extending parallel to the direction of extrusion of said hollow element.

7. Method according to claim 1, comprising the step of pressing a plurality of labels against respectively specially separated zones of the hot surface of the hollow element;

and finally adhering said labels to the body in the blow mold.

8. Method according to claim 1, wherein the step of pressing at least a portion of the label against the hot surface of the hollow element to preliminarily adhere said label comprises applying said label to the hollow element while the hollow element is moving;

and moving the label in a direction and with a speed which is essentially similar to the direction and speed of the hollow element.

9. Method according to claim 7, wherein the step of moving the label comprises moving the label in a direction which forms an acute angle with respect to the direction of extrusion to simultaneously approach the label to the hollow element while imparting to the label a vectorial direction of movement corresponding essentially to the direction of extrusion of the hollow element from the nozzle.

* * * * *